(12) United States Patent
Maslanka

(10) Patent No.: US 6,352,613 B1
(45) Date of Patent: Mar. 5, 2002

(54) RESIN COMPOSITIONS HAVING HIGH SOLIDS CONTENTS

(75) Inventor: William W. Maslanka, Landenberg, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/525,036

(22) Filed: Mar. 14, 2000

(51) Int. Cl.$^7$ .............. B31F 1/12; C08G 69/28; D21H 17/55; D21H 21/20

(52) U.S. Cl. .............. 162/111; 162/164.3; 162/164.4; 525/430; 528/335

(58) Field of Search .............. 525/430; 528/335; 162/164.6, 111, 164.3

(56) References Cited

U.S. PATENT DOCUMENTS

| | | | |
|---|---|---|---|
| 2,926,116 A | | 2/1960 | Keim .................. 162/164 |
| 2,926,154 A | | 3/1960 | Keim |
| 3,240,761 A | * | 3/1966 | Kim et al. ........... 162/164.6 X |
| 3,632,559 A | * | 1/1972 | Matter et al. ........ 162/164.6 X |
| 3,700,623 A | | 10/1972 | Keim |
| 5,278,255 A | | 1/1994 | Weaver, Jr. et al. ......... 525/421 |
| 5,373,087 A | | 12/1994 | Weaver, Jr. et al. ......... 528/335 |
| 5,393,338 A | | 2/1995 | Pudney et al. .............. 106/238 |
| 5,474,856 A | * | 12/1995 | Tamagawa et al. .. 162/164.6 X |
| 5,614,597 A | | 3/1997 | Bower ..................... 525/431 |
| 5,641,855 A | | 6/1997 | Scherr et al. ............. 528/310 |
| 5,644,021 A | | 7/1997 | Maslanka .................. 528/336 |
| 5,668,246 A | | 9/1997 | Maslanka .................. 528/336 |
| 5,912,306 A | * | 6/1999 | Pudney et al. .............. 525/430 |

FOREIGN PATENT DOCUMENTS

| | | |
|---|---|---|
| JP | 85046130 | 10/1985 |
| WO | 96/35738 | 11/1996 |
| WO | 99/09252 | 2/1999 |
| WO | 99/33901 | 7/1999 |

OTHER PUBLICATIONS

English Language Abstract of JP 85046130.

* cited by examiner

Primary Examiner—Richard D. Lovering
(74) Attorney, Agent, or Firm—Greenblum & Bernstein, P.L.C.

(57) ABSTRACT

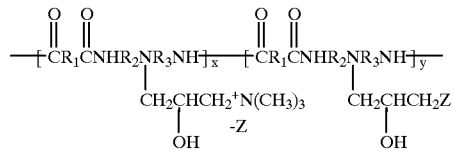

wherein
- $R_1$ is substituted or unsubstituted alkyl;
- $R_2$ is substituted or unsubstituted alkyl;
- $R_3$ is substituted or unsubstituted alkyl;
- Z is halogen selected from F, Cl, Br and I;
- x is from about 5 to about 45 mole %; and
- y is from about 55 to about 95 mole % are useful as wet strength resins and creping adhesives. Methods of producing such resins, and the use of such resins in wet strength and creping applications, as well as compositions suitable for such applications, and combinations of cellulosic product and such resins are also disclosed.

20 Claims, No Drawings

RESIN COMPOSITIONS HAVING HIGH SOLIDS CONTENTS

BACKGROUND OF THE INVENTION

1. Field of the Invention

The present invention relates to resin compositions having high solids contents useful as wet strength resins and creping compositions.

2. Discussion of Background Information

In the papermaking industry, it is common to attempt to optimize papermaking compositions in order to provide specific functional properties as efficiently and economically as possible. Wet strength resins are a common additive to papermaking compositions. These materials act to provide strength to wet paper and are used in, among other paper products, paper towel and packaging. Among other uses, they are also useful as creping adhesives. Wet strength resins may be added during paper production to bind the cellulose fibers together, and to enhance the strength of the paper produced so that the paper does not fall apart when used under wet conditions. Such resins may be added to pulp and formed paper.

Commonly available wet strength resins are marketed under the brand name KYMEME® by Hercules Incorporated, Wilmington, Del. Attempts have been made to optimize such wet strength resins. Aqueous dispersions of such resins, having relatively high solids content, are desirable.

KYMENE 557H ® has long been a benchmark for strength additives in the papermaking industry. It is based on the reaction product of poly(adipic acid-co-diethylenetriamine) and epichlorohydrin. An excess of epichlorohydrin is used to control the rate of cross-linking during the manufacturing process and to aid in storage stability. Such compositions, and processes for their manufacture are disclosed in U.S. Pat. Nos. 2,926,116 and 2,926,154, both to KEIM and commonly assigned to Hercules Incorporated. These patents are incorporated by reference as though set forth in full herein.

Originally supplied as a 10% aqueous solution, the solids of such compositions were eventually raised to about 12.5%. A number of other wet strength resins were developed with improvements based on this initial chemistry. Examples of such improvements are disclosed in U.S. patent application Ser. No. 09/363,224 filed Jul. 30, 1999 and now abandoned commonly assigned to Hercules Incorporated, and hereby incorporated by reference as though set forth in full herein; U.S. Pat. No. 5,614,597 to BOWER, commonly assigned to Hercules Incorporated, and hereby incorporated by reference as though set forth in full herein, and U.S. Pat. Nos. 5,644,021 and 5,668,246, both to MASLANKA, also commonly assigned to Hercules Incorporated, and incorporated by reference as though set forth in full herein. Illustrative of such products are KYMENE 557LX® (which include advantages of reduced epichlorohydrin by-products); KYMENE ULX (which include advantages of very low levels of epichlorohydrin by-products) and KYMENE PLUS® (which exhibit 30% solids).

The provision of effective high solids resins has been a longstanding goal in the industry, both as a benefit to suppliers as well as to paper manufacturers. It is believed that KYMENE PLUS® is the highest solids polyamide-based product, at 30% solids.

It is particularly desirable to provide a resin that provides a high solids content, while also being equivalent to the KYMEME® resins.

It is also desirable to provide a resin that would offer a significant improvement in wet strength over, for example, KYMEME® 557H wet strength resin-carboxymethyl cellulose (CMC) combinations, that would have low epihalohydrin residual levels and that would be economically repulpable. This combination of a polyamidoamine-epihalohydrin resin and CMC generates a coacervate (semi-gelatinous mass) that improves resin retention and improves overall bonding of the resin with the cellulose fibers.

Further, it is desirable to provide such a resin that is also useful as a creping adhesive.

SUMMARY OF THE INVENTION

The invention provides polyamidoamine resins. The invention also provides aqueous dispersions of such resins, and, additionally, aqueous dispersions of wet strength resins which have high solids contents and favorable wet strengthening and/or adhesion properties. Compositions of the invention are useful as wet strength resins and as creping adhesives.

The resins of the invention provide advantages of ease of production

The resins of the invention also provide advantages of high solids contents and storage stability.

In preferred embodiments, the resins of the invention are based on water-soluble polyamidoamine resins having the structure(s) set forth in Formula I, below:

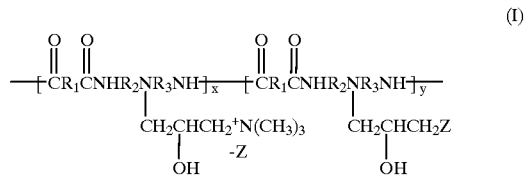

wherein:

$R_1$ is a substituted or unsubstituted hydrocarbon group;

$R_2$ is a substituted or unsubstituted hydrocarbon group;

$R_3$ is a substituted or unsubstituted hydrocarbon group; and

Z is halogen selected from F, Cl, Br and I, and combinations thereof.

The invention also relates to resin compositions containing such resins, and to methods of treating paper, paper products and cellulosic products and making paper products and cellulosic products using such resins and resin compositions.

The invention also comprises methods of preparing such resins. Such methods comprise:

reacting at least one polyamide having the structure

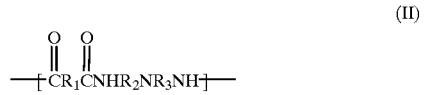

wherein $R_1$, $R_2$, and $R_3$ are as defined above;

with at least one ammonium halide compound and at least one epihalohydrin compound having the structures:

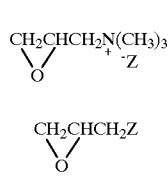

wherein
Z is as defined above.

The invention also provides water-soluble polyamides prepared from such reactants.

The invention provides methods of increasing the wet strength of a cellulosic product comprising cellulose fibers comprising adding to one of the cellulose product or fibers such a water-soluble polyamidoamine resin.

The invention provides methods of creping a cellulosic product comprising cellulose fibers comprising adding to one of the cellulose product or fibers such a water-soluble polyamidoamine resin.

The invention provides a cellulosic product prepared by the foregoing methods.

In any of the foregoing, $R_1$ may be alkyl of from 1–6 C atoms, more preferably alkyl of 3–5 C atoms, more preferably 4 C atoms; $R_2$ may be alkyl of from 2–4 C atoms, more preferably alkyl of 2 C atoms; $R_3$ may be alkyl of from 2–4 C atoms, more preferably alkyl of 2 C atoms; x is from about 10 to about 30 mole % 15, more preferably about 25 mole %; more preferably about 20 mole %, and y is from about 70 to about 90 mole %, more preferably about 75 to about 85 mole %, more preferably about 80 mole %.

In any of the foregoing, the aqueous resin composition may preferably have a solids content of at least about 35%, more preferably about 50%, more preferably about 54%, more preferably about 55%.

In any of the foregoing, x may preferably be Cl.

DETAILED DESCRIPTION OF THE INVENTION

The present invention is related to the discovery that compounds of Formula I

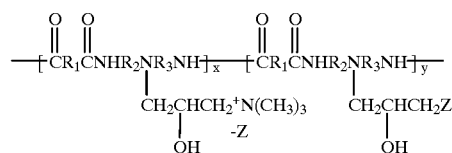

provide wet strength resins and creping adhesives which exhibit desirable properties, such as a high solids content when the resins are in the form of an aqueous dispersion. The invention is also directed to compounds of Formula (I) per se.

The invention provides significant advantages of ease of production, and in preferred embodiments, a combination of ease of production, high solids content and storage stability, which combination is highly unexpected.

Preferably, compounds of Formula I are prepared by reacting compounds of the following Formulae (II), (III) and (IV):

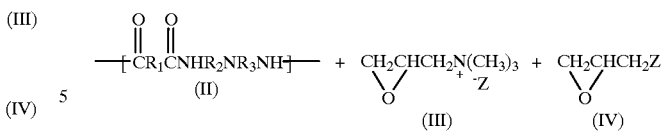

$R_1$, $R_2$ and $R_3$ may be any substituted or unsubstituted hydrocarbon moiety of any length, which allows the compound of Formula (I) to be soluble in water. For example, $R_1$, $R_2$ and $R_3$ can be straight or branched chain alkyl, alkenyl or alkynyl, cycloalkyl, cycloalkenyl, aromatic or other unsaturated cyclic compound, each of which may substituted or unsubstituted. In preferred embodiments, $R_1$, is a substituted or unsubstituted hydrocarbon group selected from alkyl, alkenyl and alkynyl; and is preferably alkyl of from 1–6 C atoms, preferably 3–5 C atoms, more preferably 3–4 C atoms, and most preferably 4 C atoms; $R_2$ is a substituted or unsubstituted hydrocarbon group selected from alkyl, alkenyl and alkynyl; and is preferably alkyl, of from 2–4 C atoms, most preferably 2 C atoms; and $R_3$ is a hydrocarbon group selected from alkyl, alkenyl and alkynyl; and is preferably alkyl of from 2–4 C atoms, most preferably 2 C atoms.

In the compounds of Formula (I), x is from about 5 to about 45 mole %, more preferably from about 10 to about 40 mole %, more preferably from about 10 to about 30 mole %, most preferably from about 10 to about 20 mole %, preferably about 20 mole % for wet strength applications and about 10 mole % for creping adhesives; and y is from about 55 to about 95 mole %, preferably from about 60–90 mole %, more preferably from about 70 to about 90 mole % and most preferably from about 80 to about 90 mole %, preferably about 80 mole % for wet strength applications, and about 90% for creping adhesives.

Preferably, for wet or dry strength resins, the ratio of the amount of compound of Formula (IV) and compound of Formula (II) employed should be kept as close to 1 as possible. Preferably, the mole ratio of compound IV to compound II is about 1, or less, based on mole %. Compound III is preferably employed in an amount of at least about 15 mol %, preferably at least about 25 mol %, based on the secondary amine of the compound of Formula II.

Additionally for wet or dry strength resins, the amount of compounds III and IV employed is such that the total molar amount of compound III+compound IV is stoichiometrically equal to the number of the secondary amine on the polyamide of formula II.

An exemplary composition is one employing about 20 mole % of a compound of Formula II, based on the molar amount of the compound of Formula III employed, and about 80 mole % of a compound of Formula IV, based on the molar amount of the compound of Formula III employed.

The epichlorohydrin:polyamine mole ratio, for applications both as wet strength resin and as a creping adhesive should be kept as close to 1:1 as possible, but lower ratios may be employed, on the order of 0.9:1 to about 0.95:1, as opposed to 1:1.

For utility as wet strength resins mole ratios of epichlorohydrin:quatemary amine (for example GTMAC) on the order of about 8:2 (4:1) may be employed. For utility as creping adhesives, epichlorohydrin:quatemaryamine (for example GTMAC) mole ratios on the order of 9:1 to about 9.5:1 may be employed.

In general, the utility of the compounds of the invention may be directed by varying pH of compositions containing the compounds. For use as a wet strength resin, the compounds of the invention may be activated with caustic.

Without wishing to be bound by theory, it is believed that both of the epoxide-based materials react with the secondary amine groups in the polyamidoamine backbone to provide cationic charge and aminochlorohydrin groups. The amount of each may be varied so as to vary the cationic charge versus potential azetidinium functionality.

Examples of compounds of Formula (II) include reaction products of dicarboxylic acids and alkylamines. Suitable dicarboxylic acids and alkylamines are set forth in U.S. Pat. No. 2,926,116 to KEIM, incorporated by reference herein above as well as specifically herein for its disclosure of such materials. Preferred compounds of Formula II include those wherein $R_1$, $R_2$ and $R_3$ are as defined above; however, any compound in accordance with Formula II can be employed, as long as it is soluble in water. Dicarboxylic acids having from about 3 to about 10 carbon atoms are particularly preferred. Examples of such compounds include adipic acid, glutaric acid, malonic acid, sebacic acid, sebaric acid, etc. Examples of suitable alkylamines include polyalkylamines, and include iminobispropylamine, triethylenetetra-amine, tetraethylenepentamine, etc.

Examples of compounds of Formula (III) include epoxides or aminohalohydrins, preferably aminochlorohydrins, bearing quaternary ammonium groups.

Examples of compounds of Formula (IV) include epihalohydrins, such as epichlorohydrin, epibromohydrin and epi-iodohydrin.

In particularly preferred embodiments, resins of the invention are prepared by reacting a compound of Formula II comprising a polyamidoamine, with a compound of Formula III comprising a glycidyltrimethylammonium chloride ("GTMAC"), activated with a base to form the quaternary ammonium and oxirane portions (the activation procedure being standard and well-known to those of ordinary skill in the art), and a compound of Formula IV comprising an epihalohydrin, for example, epichlorohydrin. $R_1$, $R_2$ and $R_3$ can be varied beyond the preferred ranges given above, so long as the compounds are water soluble. Exemplary embodiments include those prepared by reacting starting materials including an amidoamine polymer at low temperature with glycidyltrimethylammonium chloride and epichlorohydrin. This provides at least some level of cationic charge for resin retention and aminochlorohydrin for potential functionality (azetidinium).

The reaction of compounds (II), (III) and (IV) can be conducted in any manner that produces compounds of Formula (I). Compounds (II), (III) and (IV) can be reacted together in a single reaction or in essentially a single reaction, such as, for example, by being added to the reaction vessel concurrently or essentially concurrently, or by adding compound (III) to compound (II) followed by immediately adding compound (IV) to the mixture upon completion of the addition of compound (III) to the mixture. Alternatively, compounds (II) and (III) can be reacted together first, followed by reacting the resultant compound with a compound of Formula (IV).

With either approach, the reaction with compound (IV) is preferably conducted at relatively low temperatures, preferably at temperatures slightly above room temperature. For example, reaction temperatures of, for example, up to about 35° C. have been found to be suitable. Preferably, reaction temperatures in the range of about 25–35° C. are utilized, more preferably up to about 33° C., more preferably about 25°–30° C. It will be understood that the temperature of the reaction mixture may be maintained in any suitable standard way, such as with a water jacket, ice bath or air. Preferably, the reaction is conducted with cooling, preferably, by ice, such as by an ice bath or a circulating cold water bath. The compounds of Formula IV are preferably added in such a manner as to control the temperature of the reaction mixture; preferably, dropwise.

In cases where compounds of Formulae (II) and (III) are reacted with each other first, this portion of the reaction can be conducted at higher temperatures. For example, the reaction can be conducted at temperatures of up to about 80° C., or higher, preferably less than about 60° C., more preferably less than about 50° C. and more preferably less than about 45° C., with one preferred range being from about 45° C. to about 50° C.

The reaction of compounds (II) and (III) is preferably conducted to completion, which has been found to take place in a time period of from about 30 to about 45 minutes.

When compound (IV) is added (either concurrently or after reaction of (II) and (III)), the reaction is preferably conducted to completion. Reaction times on the order of about 20–24 hrs have been found to be suitable, in accordance with the present invention. Longer reaction times may also be employed, as long as the reaction temperatures are maintained low, such as closer to room temperature. The term "to completion" is readily understood by those of ordinary skill in the art. Moreover, whether a reaction has been conducted to completion can also be determined by analysis of residual reactants, such as by gas chromatography.

The fact that the reaction of the invention can be conducted to completion provides a decided advantage in processing. Conventional reactions must be stopped prior to completion, because of the rise in viscosity, often resulting in gelling of the reaction mixture. In preferred embodiments, the reaction of the invention can be conducted to completion without gelling or substantially without gelling. This is so even under conditions of high solids.

Compounds of Formulae (II), (III), and IV) are preferably employed in amounts that result in a solids content in the reaction mix of from about 50% to about 55% solids, with the amounts of (II), (III), and (IV) relative to each other as set forth above.

The same general procedure as above may be employed throughout this series of resins and is otherwise identical to that used in the synthesis of KYMEME 557LX (disclosed in U.S. Pat. No. 5,614,597 to BOWER, which is hereby incorporated by reference as though set forth in full herein), except that the reaction is terminated after the alkylation step. At this point, the resin has cationic charge, minimum azetidinium and predominantly aminochlorohydrin groups (potential azetidinium or epoxide functionality). The resin, which has a low molecular weight due to the lack of cross-linking, can be stabilized with acid at approximately 50–55%, by weight solids.

Acid is added for stabilization to adjust the pH of the composition to a range of from about 2.5–4, preferably about 3–3.5. Any suitable acid may be employed, such as hydrochloric, sulfuric, nitric, formic, phosphoric and acetic acid. Hydrochloric acid is particularly preferred.

Glycidyltrimethylammonium chloride (GTMAC) (a particularly preferred compound of Formula III) may be generated from Quat 188® [N-(3-chloro-2-hydroxypropyl) trimethylammonium chloride], available from Dow Chemical, Midland, Mich. via treatment with caustic prior to addition to the polyamide solution.

Preferred aqueous dispersions in accordance with the invention are those having a solids content of greater than 30%, preferably at least about 35%, more preferably at least about 50% and most preferably at least about 54% or at least about 55% based on the amount of resin, by weight, in comparison with the weight of the entire composition. Preferably, the solids content is measured by the following procedure: A sample of aqueous resin is first weighed and is then dried at a temperature of 150° C., for a time period of about an hour or until constant weight, or until no water remains. The residue remaining is then weighed and the weight percent of the aqueous resin is then calculated based on the following: weight residue (resin)/weight of aqueous resin. The resulting value, expressed in weight percent, is the solids content of the (aqueous) resin.

In some embodiments, the present invention provides a resin having a total solids of 50–55% with an efficiency of about 90% that of KYMEME 557H. The solids content is 15–25% higher than existing resins. In addition, the resins of the invention exhibit excellent adhesion properties.

The resins of the invention may be activated in any suitable way; preferably, they are activated by treatment with caustic to convert halohydrins to epoxides. This allows the resin to crosslink with itself or cellulose fibers. Hydroxides are preferred materials for activation. Sodium hydroxide is particularly preferred. In particularly preferred embodiments, activation is carried out by adding sodium hydroxide (5M) equivalent to the chlorohydrin content in the resin. The activated resin may then be diluted to 20% solids for application to the pulp. Further, it is contemplated that direct activation could be employed by using sodium carbonate or sodium bicarbonate, versus merely adding the resin to a neutral papermaking system. Additionally, direct activation may produce predominantly epoxide groups from the aminochlorohydrins.

Merely neutralizing the resin much like what would be experienced in a papermaking system generates azetidinium but at a very slow rate. Ideally, it would be desired to pump the resin from a drum into the papermaking system and have it "activate" under neutral papermaking conditions. Any other bases may be employed as well as a way of activating the resins.

The reduced specific viscosity (RSV) is preferably about 0.139 to about 0.155 dL/g measured in 1.0N $NH_4Cl$ at 2.0%. The method employed is based on ASTM D446.

The processes of the invention can be conducted batchwise, continuously or semi-continuously and can be readily so modified by those of ordinary skill in the art.

The invention also comprises methods of increasing the wet strength of cellulosic products by adding the resins of the invention to cellulosic materials to produce wet strengthened cellulosic materials. The resins can be added at the wet end of processes for manufacturing cellulosic products. Procedures for wet strengthening such cellulosic products in which wet strength resins of the invention may be used are well known to those of ordinary skill in the papermaking art, and are disclosed in, for example, U.S. Pat. No. 2,926,154, to KEIM, incorporated by reference above and herein specifically for such disclosure.

The invention also comprises cellulosic products comprising cellulosic fibers and such wet strength resins. The resin component of such components is novel, as is discussed above. Cellulosic products containing cellulosic products and wet strength resins are disclosed in the documents incorporated by reference above, which documents are hereby incorporated by reference as though set forth in full herein.

Methods of the invention also comprise using the resins as creping adhesives. Procedures in which the resins of the invention may be used as creping adhesives are also are well known to those of ordinary skill in the papermaking art.

Without further elaboration, it is believed that one skilled in the art can, using the preceding description, utilize the present invention to its fullest extent.

The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Example 1

Reaction of Poly(adipic Acid co-diethylenetriamine) with Glycidyltrimethylammonium Chloride and Epichlorohydrin Exemplary resins were prepared in accordance with the following procedure. Ratios of GTMAC and epichlorohydrin were varied but the same general procedure was used throughout.

The apparatus consisted of a jacketed resin kettle, mechanical stirrer, thermocouple, THERM-O-WATCH thermostated bath, pressure equalized addition funnel.

Poly(adipic acid co-diethylenetriamine) (106.7 g, 213.1 g 50.1% solution, 0.5 mole) was charged to the reaction vessel. Glycidyltrimethylammonium chloride was prepared by adding 10 cc 5MNaOH to 15.7 g 60% Quat 188 to generate 7.6 g (0.05 mole) of the epoxide. This was added dropwise to the polyamide solution along with 41.7 g (0.45 mole) of epichlorohydrin, the glycidyltrimethylammonium chloride being added first, epichlorohydrin being added second.

The temperature was maintained at 25–30° C. for approximately 19 hours. The pH was adjusted to 3.4 with concentrated HCl (30.2 g).

Total solids=53.9%

Brookfield viscosity=275 cps (Spindle #2, 60 rpm, at 60° C.).

Other resins were synthesized using varying amounts of polyamide, GTMAC and epichlorohydrin. Table 1 summarizes the resin syntheses. In Table 1, designation D is a control, using no GTMAC. Other aspects of the syntheses summarized in Table 1 are referenced herein, as well, in conjunction with other parameters of the resin synthesis and products thereof.

Referring to Table 1, the resin syntheses were carried out at low temperature (25–30° C.) overnight. The synthesis procedures employed were the procedure as above. The final products were stabilized with concentrated HCl at a pH of 3.2–3.5. In the case of the control (D), the pH was 2.7. These resins remained stable for about five months at which time they were gelled or gel-like. This indicates that the resins exhibited unexpectedly high stability.

The activated resins were stored in an ice bath between runs and also allowed to stand at room temperature.

Comparison between ice stored and room temperature stored resins showed that ice stored activated may be slightly better in some cases.

Interesting results from this evaluation can be found in the data from the evaluation of the resins alone. Tensile strengths of resins of the invention were compared directly with KYMEME 557H. The results are shown in Table 2, discussed in detail further below (both wet and dry tensile strength). The cured data show the resins of the invention to be at least about 89% as effective as KYMEME 557H. This initial evaluation showed promise from the standpoint of efficiency and total solids. Based on these results, resin B showed particular promise. The results for Run 1, Run 5, Run 10, Run 15 and Run 20 are summarized in Table 3.

Some additional work was done in which reduced epichlorohydrin:polyamide mole ratios were examined (0.90:1, 0.95:1 vs. 1:1). Also, a series of resins was prepared with increased levels of GTMAC (10–90 mole %). Table 4 summarizes the synthesis data on these resins. These results show, that lower amounts of epichlorohydrin may be employed to produce resins of the invention which exhibit satisfactory performance.

In the series E through J in the Tables, attempts were made to reduce the epichlorohydrin:polyamide mole ratio from the initially used 1:1 to 0.90:1. In the case of E, the final product synthesized at 56.4% yielded a high viscosity product. Repeating the experiment (J) at lower reaction solids (50%) yielded a product with much lower viscosity (236 cps). These resins were synthesized by reacting the polyamide with 10 mole GTMAC based on polyamide and 0.95 and 0.90:1 epichlorohydrin to amine. Attempts to carry out similar type reactions with polyamides modified with 20 mole percent GTMAC were unsuccessful with the 0.9:1 epichlorohydrin:amine mole ratio. Two controls (H and I) contained no GTMAC.

Example 2

Handsheet Evaluation

The candidate resins were evaluated in handsheets prepared from 50/50 Rayonier bleached Kraft ("RBK")/softwood Kraft pulp beaten to 500 cc CSF (Canadian Standard Freeness) at pH 7.5. Normal resin furnish level was 0.5% based on dry pulp.

The activated resins (base was added to free all of the amine groups and to generate epoxide and azetidinium groups) were evaluated in handsheets [50/50 RBR/SWK pulp, 500 cc CSF, pH 7.5] alone or in combination with CMC against a KYMEME® 557H wet strength resin-CMC control. U.S. Pat. No. 3,700,623 is hereby incorporated by reference as though set forth in full herein for its disclosure of how to activate resins. Table 2 shows the data from this evaluation. In all cases where these resins were used in combination with CMC, the results were about 70–75% as efficient as the controls.

Table 5 summarizes the results of handsheet evaluation. Again, the evaluation was carried out under the same conditions as used previously, e.g., 50/50 RBK/SWK pulp, 500 cc Canadian Standard Freeness, pH 7.5. The data showed that the high solids resins containing GTMAC except for H out preformed the KYMEME® 557H wet strength resin control by as much as 14–21%.

Example 3

Variation of Component Ratios

A reevaluation of the resins along with an evaluation of the resins containing increased levels of GTMAC relative to epichlorohydrin produced additional data. Tables 4 and 6 summarize these results.

The data do not show the increases over KYMEME 557H observed in Table 5, however, the data appear to demonstrate that very effective resins have been prepared with reduced epichlorohydrin:amine mole ratios (F, G).

In the cases where the amount of GTMAC was gradually increased in the formulation (K→P) (10–90 mole percent GTMAC), increased GTMAC, reduced amount of epichlorohydrin produced a less effective resin.

Example 4

Creping Applications

Data were generated from an evaluation of the resins in creping applications.

A series of resins was synthesized with GTMAC levels ranging from 10–90 mole percent with the remainder of the amine in the backbone reacted with epichlorohydrin much like in the cases mentioned earlier (Tables 4 & 7).

Adhesive Testing: The following equipment and procedures were utilized. The apparatus for determining the adhesive properties of the candidate materials consisted of a modified Instron Tensile Tester. A base plate was heated to 250° F. and the adhesive was applied. Another plate containing a paper sample was pressed against the adhesive surface (10 Kg force). The top plate was pulled away and the force required to accomplish this was recorded.

Table 8 summarizes the results from this evaluation (pH 4.5 and 7.0). The data show that the high solids resins exhibit excellent adhesion especially at low pH. The adhesion decreases as the level of GTMAC increases. At low pH, resins having as high as 75 mole percent GTMAC out perform Crepetrol® 80E cationic polymer. Those in the range of 10–50% GTMAC performed best. At high pH (7.0), all of the resins were less effective than the controls.

These data show that under certain conditions, these types of resins can function very effectively as creping adhesives. Like the resins employed as wet strength additives, a number of modifications can be made in attempting to optimize such products, e.g., polyamide molecular weight, GTMAC:epichlorohydrin ratio and stabilizing acid.

Example 5

Synthesis of High Solids Resin from Poly(adipic Acid-co-diethylenetriamine, Quat 188 and Epichlorohydrin and Additional Testing Poly(adipic acid-co-diethylenetriamine) (106.7 g, 213.1 g 50% solution, 0.5 mole) was charged to the reaction vessel. Quat 188 [3-(chloro-2-hydroxypropyl)trimethylammonium chloride] [18.8 g, 31.3 g 60% solution, 0.10 mole] was treated with 10 cc of 5M NaOH and added to the reaction vessel. Epichlorohydrin (37 g, 0.4 mole) was added while maintaining the temperature below 30° C. The reaction mixture was stirred at 28–30° C. for 20 hours followed by pH adjustment to 3 with concentrated HCl. The final resin had a total solids of 53.6% and Brookfield viscosity of 617 cps.

The resulting resin and related parameters are shown in Table 9. Adhesion testing using this resin is shown in Table. 10.

CONCLUSION

In summary, with respect to high solids strength additives based on poly(adipic acid co-diethylenetriamine) modified with GTMAC and epichlorohydrin, it is clear that it is possible to synthesize an effective high solids resin that is very nearly as effective as KYMEME 557H. It is contemplated that the invention could be expanded beyond the instantly-exemplified compounds. For example, in the case of the polyamide, molecular weight, composition, dibasic acid and polyamine could be optimized.

Further, it is contemplated that the resin synthesis could be expanded to optimize the quaternary level, epichlorohydrin:amine mole ratio, reaction time and stabilization.

Additionally, reduced levels of epichlorohydrin:amine mole ratios produce resins which are particularly effective in creping applications.

It is also possible to apply the invention to two part wet strength systems (cationic-anionic systems).

TABLE 1

SYNTHESIS OF HIGH SOLIDS POLYAMIDE RESINS

| DESIGNATION | POLYAMIDE Wt (g) | MOLES | GTMAC Wt (g) | MOLES | EPICHLORO-HYDRIN Wt (g) | MOLES | REACTION SOLIDS (%) | TEMP (° C.) | HCl (g)[c] |
|---|---|---|---|---|---|---|---|---|---|
| A | 213.1 g[a] | 0.50 | 7.6[b] | 0.05 | 41.7 | 0.45 | 56.3 | 28–31 | 36.5 |
| B | 213.1 g[a] | 0.50 | 15.2[d] | 0.10 | 37.0 | 0.40 | 53.9 | 24–28 | 38.9 |
| C | 213.1 g[a] | 0.50 | 22.8[e] | 0.15 | 32.4 | 0.35 | 51.9 | 25–28 | 39.2 |
| D | 213.1 g[a] | 0.50 | — | — | 46.3 | 0.50 | 59.0 | 24–28 | 38.9 |

| DESIGNATION | pH | TOTAL SOLIDS (%) | BROOKFIELD VISCOSITY (cps) | CHARGE DENSITY (meq/g) pH 1.8 | pH 8.0 | GC ANALYSIS % EPI | % 1,3 DCP | % 2,3 DCP | % CPD | STABILITY 25° C. |
|---|---|---|---|---|---|---|---|---|---|---|
| A | 3.2 | 55.6 | 771 | 2.79 | 0.36 | 0.01 | 0.59 | ND | 0.03 | 5 MONTHS |
| B | 3.2 | 53.6 | 617 | — | — | <0.01 | 0.44 | ND | 0.02 | 5 MONTHS |
| C | 3.4 | 52.7 | 563 | — | — | <0.01 | 0.55 | ND | 0.02 | 5 MONTHS |
| D | 2.7 | 57.0 | 600 | — | — | <0.01 | 0.70 | ND | 0.08 | — |

[a] Poly(adipic acid co-diethylenetriamine) TS = 50.1%
[b] 15.7 g 60% Quat 188 + 10 cc 5 MNaOH
[c] Conc HCl (37.3%)
[d] 31.4 g 60% Quat 188 + 20 cc 5 MNaOH
[e] 47.1 g 60% Quat 188 + 30 cc 5 MNaOH

TABLE 2

EVALUATION OF HIGH SOLIDS RESINS IN COMBINATION WITH CMC

| RUN NO. | RESIN | 1st PROP DESIGN. | % | 2nd PROP DESIGN. | % | BASIS WEIGHT | DRY TENSILE UNCURED | CURED | WET TENSILE UNCURED | CURED |
|---|---|---|---|---|---|---|---|---|---|---|
| 1 | RT | K557H | 0.5 | — | — | 40.0 | 18.9 | 18.6 | 3.62 | 3.67 |
| 2 | RT | " | 0.5 | CMC 7MT | 0.1 | 40.0 | 16.8 | 18.7 | 3.65 | 3.83 |
| 3 | RT | " | 0.5 | " | 0.2 | 40.0 | 17.7 | 18.9 | 3.86 | 4.00 |
| 4 | RT | " | 0.5 | " | 0.3 | 40.0 | 19.6 | 21.1 | 3.89 | 4.19 |
| 5 | ICE[a] | A | 0.5 | — | — | 40.0 | 16.5 | 16.3 | 3.08 | 3.07 |
| 6 | ICE | " | 0.5 | CMC 7MT | 0.10 | 40.0 | 14.6 | 14.8 | 2.19 | 2.26 |
| 7 | ICE | " | 0.5 | " | 0.2 | 40.0 | 13.5 | 13.5 | 1.64 | 1.81 |
| 8 | ICE | " | 0.5 | " | 0.3 | 40.0 | 14.0 | 14.5 | 1.70 | 1.72 |
| 9 | 30 MIN AT RT | " | 0.5 | " | 0.2 | 40.0 | 13.8 | 14.3 | 1.77 | 1.89 |
| 10 | ICE | B | 0.5 | — | — | 40.0 | 16.7 | 16.7 | 3.02 | 3.26 |
| 11 | ICE | " | 0.5 | CMC 7MT | 0.10 | 40.0 | 15.1 | 15.4 | 2.58 | 2.70 |
| 12 | ICE | " | 0.5 | " | 0.20 | 40.0 | 14.9 | 14.3 | 1.94 | 2.03 |
| 13 | ICE | " | 0.5 | " | 0.30 | 40.0 | 14.8 | 14.1 | 1.98 | 2.19 |
| 14 | 30 MIN AT RT | " | 0.5 | " | 0.20 | 40.0 | 13.8 | 12.9 | 1.88 | 1.94 |
| 15 | ICE | C | 0.5 | — | — | 40.0 | 16.9 | 16.6 | 2.71 | 3.04 |
| 16 | ICE | " | 0.5 | CMC 7MT | 0.1 | 40.0 | 16.5 | 15.2 | 2.67 | 2.77 |
| 17 | ICE | " | 0.5 | " | 0.2 | 40.0 | 15.0 | 15.7 | 2.27 | 2.35 |
| 18 | ICE | " | 0.5 | " | 0.3 | 40.0 | 14.0 | 14.7 | 1.93 | 1.94 |
| 19 | 30 MIN AT RT | " | 0.5 | " | 0.2 | 40.0 | 15.2 | 14.5 | 2.41 | 2.56 |
| 20 | ICE | D | 0.5 | — | — | 40.0 | 13.9 | 13.7 | 1.85 | 1.09 |
| 21 | ICE | " | 0.5 | CMC 7MT | 0.1 | 40.0 | 12.8 | 12.4 | 1.24 | 1.36 |
| 22 | ICE | " | 0.5 | " | 0.2 | 40.0 | 12.8 | 13.5 | 1.15 | 1.34 |
| 23 | ICE | " | 0.5 | " | 0.3 | 40.0 | 13.2 | 12.7 | 1.25 | 1.37 |
| 24 | 30 MIN AT RT | " | 0.5 | " | 0.2 | 40.0 | 12.8 | 12.7 | 1.26 | 1.30 |

50/50 RBK/JRBK Pulp
500 cc CSF, pH 7.5
40 lb/ream B.W.
(a) activated resin stored in ice bath between runs

TABLE 3

EVALUATION OF HIGH SOLIDS RESINS WITH NO CMC

| DESIGNATION | BASIS WEIGHT | DRY TENSILE UNCURED | DRY TENSILE CURED | WET TENSILE UNCURED | WET TENSILE CURED |
|---|---|---|---|---|---|
| KYMENE ® 557H | 40.0 | 18.9 | 18.6 | 3.62 | 3.67 |
| A | 40.0 | 16.5 | 16.3 | 3.08 | 3.07 |
| B | 40.0 | 16.7 | 16.7 | 3.02 | 3.26 |
| C | 40.0 | 16.9 | 16.6 | 2.71 | 3.04 |
| D | 40.0 | 13.9 | 13.7 | 1.85 | 1.90 |

50/50 RBK/JRBK Pulp
500 cc CSF, pH 7.5

TABLE 4

SYNTHESIS OF HIGH SOLIDS RESINS (VARIOUS EPI:AMINE RATIO/VARIOUS GTMAC LEVELS)

| DESIGNATION | POLYAMINE Wt (g) | POLYAMINE MOLES | GTMAC Wt (g) | GTMAC MOLES | EPICHLOROHYDRIN Wt (g) | EPICHLOROHYDRIN MOLES | REACTION SOLIDS (%) | REACTION TEMP (° C.) |
|---|---|---|---|---|---|---|---|---|
| E | 211[a] | 0.5 | 7.6[b] | 0.05 | 39.6 | 0.428 | 56.4 | 28–30 |
| F | 211[a] | 0.5 | 7.6[b] | 0.05 | 37.5 | 0.405 | 49.7 | 26–28 |
| G | 211[a] | 0.5 | 15.2[d] | 0.10 | 35.2 | 0.38 | 49.1 | 25–28 |
| H | 211[a] | 0.5 | — | — | 43.9 | 0.475 | 50.4 | 28 |
| I | 211[a] | 0.5 | — | — | 41.7 | 0.45 | 50.4 | 25–28 |
| J | 211[a] | 0.5 | 7.6[b] | 0.05 | 39.6 | 0.428 | 50.0 | 25–28 |
| K | 209.2[e] | 0.5 | 7.6*[b] | 0.05 | 41.6 | 0.45 | 56.4 | 25–29 |
| L | 418.4[e] | 1.0 | 37.6[f] | 0.20 | 74.0 | 0.80 | 54.6 | 27–29 |
| M | 209.2[e] | 0.5 | 18.9[g] | 0.125 | 34.7 | 0.375 | 45 | 25–30 |
| N | 209.2[e] | 0.5 | 37.9[h] | 0.25 | 23.1 | 0.25 | 45 | 25–29 |
| O | 209.2[e] | 0.5 | 56.8[i] | 0.3 | 11.6 | 0.125 | 45 | 25–30 |
| P | 209.2[e] | 0.5 | 68.2[j] | 0.45 | 4.6 | 0.05 | 45 | 25–29 |

| DESIGNATION | HCl (g) | pH | TOTAL SOLIDS | BROOKFIELD VISCOSITY (cps) | CHARGE DENSITY (meq/g) pH 1.8 | CHARGE DENSITY (meq/g) pH 8.0 | GC ANALYSIS % EPI | GC ANALYSIS % 1,3 DCP | GC ANALYSIS % 2,3 DCP | GC ANALYSIS % CPD |
|---|---|---|---|---|---|---|---|---|---|---|
| E | 44.0 | 1[c] | 54.9 | 3698 | 2.79 | 0.15 | ND | 0.39 | <0.002 | 0.105 |
| F | 38.8 | 2.3 | 49.3 | 960 | 2.85 | 0.31 | ND | 0.28 | <0.002 | 0.03 |
| G | 40.0 | 2.0 | 49.2 | 991 | 2.88 | 0.72 | ND | 0.40 | <0.002 | 0.030 |
| H | 38.6 | 2.4 | 49.4 | 183 | 2.63 | 0.22 | ND | 0.44 | <0.002 | 0.093 |
| I | 38.0 | 2.4 | 49.7 | 236 | — | — | ND | 0.37 | <0.002 | 0.041 |
| J | 38.9 | 3.1 | 49.0 | 419 | 2.81 | 0.26 | — | — | — | — |
| K | 37.1 | 2.8 | 56.0 | 880 | — | — | ND | 0.79 | ND | 0.052 |
| L | 76.2 | 3.0 | 53.7 | 932 | — | — | ND | 0.82 | ND | 0.037 |
| M | 37.7 | 2.9 | 47.8 | 244 | — | — | ND | 0.57 | ND | 0.034 |
| N | 42.0 | 2.9 | 49.9 | 220 | — | — | ND | 0.36 | ND | 0.014 |
| O | 43.7 | 2.8 | 49.3 | 103 | — | — | ND | 0.17 | ND | 0.007 |
| P | 45.3 | 2.8 | 48.3 | 24 | — | — | ND | 0.06 | ND | 0.00 |

[a]Poly(adipic acid co-diethylenetriamine) (ts = 50.6%)
[b]15.7 g 60% Quat 188 + 10 cc 5 MNaOH
[c]pH too low
[d]31.4 g 60% Quat 188 + 20 cc 5 MNaOH
[e]Poly(adipic acid co-diethylenetriamine) (ts = 51%)
[f]62.6 g 60% Quat 188 + 40 cc 5 MNaOH
[g]39.2 g 60% Quat 188 + 25 cc 5 MNaOH
[h]78.3 g 60% Quat 188 + 75 cc 5 MNaOH
[i]117.5 g 60% Quat 188 + 75 cc 5 MNaOH
[j]141 g 60% Quat 188 + 90 cc 5 MNaOH

TABLE 5

HANDSHEET EVALUATION OF HIGH SOLIDS WET STRENGTH RESINS

| DESIGNATION | BASIS WEIGHT | DRY TENSILE (Lbs./In.) UNCURED | DRY TENSILE (Lbs./In.) CURED[a] | WET TENSILE (Lbs./In.) UNCURED | WET TENSILE (Lbs./In.) CURED[a] |
|---|---|---|---|---|---|
| E | 40.0 | 17.3 | 17.2 | 3.96 | 4.08 |
| F | 40.0 | 16.1 | 17.2 | 3.92 | 4.13 |

TABLE 5-continued

HANDSHEET EVALUATION OF HIGH SOLIDS WET STRENGTH RESINS

| DESIGNATION | BASIS WEIGHT | DRY TENSILE (Lbs./In.) UNCURED | CURED[a] | WET TENSILE (Lbs./In.) UNCURED | CURED[a] |
|---|---|---|---|---|---|
| G | 40.0 | 16.8 | 17.4 | 3.95 | 3.98 |
| H | 40.0 | 14.6 | 14.7 | 2.94 | 3.04 |
| I | 40.0 | 15.2 | 16.2 | 3/35 | 3.76 |
| J | 40.0 | 16.7 | 17.4 | 3.92 | 4.04 |
| KYMENE 557H | 40.0 | 14.7 | 16.3 | 3.24 | 3.61 |

50/50 RBK/SWK Pulp
500 cc CSF, pH 7.5
[a] 80° C. for 30 Min.

TABLE 6

EVALUATION OF HIGH SOLIDS WET STRENGTH RESINS

| DESIGNATION | BASIS WEIGHT | DRY UNCURED | CURED[a] | WET UNCURED | CURED[a] |
|---|---|---|---|---|---|
| F | 40.0 | 13.5 | 14.4 | 2.95 | 3.15 (94.3%) |
| G | 40.0 | 14.9 | 15.6 | 2.79 | 3.16 |
| H | 40.0 | 12.0 | 11.0 | 2.06 | 2.89 |
| I | 40.0 | 13.7 | 13.2 | 2.55 | 2.24 |
| J | 40.0 | 13.8 | 13.5 | 2.86 | 2.66 |
| K | 40.0 | 13.4 | 14.2 | 2.70 | 3.14 |
| L | 40.0 | 13.8 | 14.4 | 2.74 | 2.76 |
| M | 40.0 | 14.0 | 14.1 | 2.89 | 2.81 |
| N | 40.0 | 13.3 | 13.2 | 2.10 | 3.03 |
| O | 40.0 | 11.3 | 11.1 | 1.13 | 2.38 |
| P | 40.0 | 11.0 | 11.2 | 0.40 | 1.27 |
| KYMENE 557H | 40.0 | 14.3 | 14.8 | 3.04 | 3.34 |

50/50 RBK/SWK Pulp
500 cc CSF, pH 7.5
[a] 80° C. for 30 Min.

TABLE 7

SYNTHESIS OF HIGH SOLIDS RESINS FOR CREPING APPLICATIONS

| DESIGNATION | POLYAMIDE Wt (g) | MOLES | GTMAC Wt (g) | MOLES | EPICHLOROHYDRIN Wt (g) | MOLES | REACTION SOLIDS (%) | TEMP (° C.) |
|---|---|---|---|---|---|---|---|---|
| K | 209.2[a] | 0.5 | 7.6[b] | 0.05 | 41.6 | 0.45 | 56.3 | 25–30 |
| M | 209.2[a] | 0.5 | 18.9[c] | 0.125 | 34.7 | 0.375 | 35 | 25–30 |
| N | 209.2[a] | 0.5 | 37.9[e] | 0.25 | 23.1 | 0.25 | 45 | 25–30 |
| O | 209.2[a] | 0.5 | 56.8[f] | 0.375 | 11.6 | 0.125 | 45 | 25–30 |
| P | 209.2[a] | 0.5 | 68.2[g] | 0.45 | 4.6 | 0.05 | 45 | 25–30 |

| DESIGNATION | HCl[h] (g) | pH | TOTAL SOLIDS (%) | BROOKFIELD VISCOSITY (cps) | GC ANALYSIS % EPI | % 1,3 DCP | % 2,3 DCP | % CPD |
|---|---|---|---|---|---|---|---|---|
| | 37.1 | 2.8 | 56.0 | 880 | ND | 0.79 | ND | 0.052 |
| | 36.8 | 2.8 | 37.2 | 65 | ND | 0.43 | ND | 0.042 |
| | 42.0 | 2.9 | 50.0 | 220 | ND | 0.36 | ND | 0.014 |
| | 43.6 | 2.8 | 49.4 | 103 | ND | 0.17 | ND | 0.007 |
| | 45.3 | 2.9 | 48.3 | 74 | ND | 0.06 | ND | 0.004 |

[a] Poly(adipic acid co-diethylenetriamine) T.S. = 51%
[b] 15.7 g 60% Quat 188 + 10 cc 5 M NaOH
[c] 39.2 g 60% Quat 188 + 25 cc 5 M NaOH
[d] 78.3 g 60% Quat 188 + 50 cc 5 M NaOH
[e] 117.5 g 60% Quat 188 + 75 cc 5 M NaOH

TABLE 7-continued

SYNTHESIS OF HIGH SOLIDS RESINS FOR CREPING APPLICATIONS (f)141.0 g 60% Quat 188 + 90 cc 5 M NaOH
(g)Concentrated HCl (37.3%)

TABLE 8

ADHESION TESTING - HIGH SOLIDS WET STRENGTH RESINS

| | ADHESION (Kgs.) | |
|---|---|---|
| DESIGNATION | pH 4.5 | pH 7.0 |
| K | 38.1 | 25.5 |
| Q | 35.0 | 23.2 |
| M | 37.3 | 25.0 |
| N | 31.9 | 23.1 |
| O | 29.5 | 25.3 |
| P | 26.8 | 22.9 |
| R | 27.4 | 35.3 |
| CREPETROL ® 80E | 28.1 | 27.6 |

250° F. Platen temperature
10 Kg Compression force
70/30 HW/SW Sheet

TABLE 9

Synthesis of High Solids Wet Strength Resin with Reduced Epichlorohydrin:Amine Molar Ratio

| Designation | Moles Polyamide | Moles Quat 188 | Moles NaOH | Moles Epichlorohydrin | | Solids (5) | Reaction Temp (° C.) | Time (Hours) | pH | Total Solids (%) | Brookfield Viscosity (cps) |
|---|---|---|---|---|---|---|---|---|---|---|---|
| E | 0.5 | 0.05 | 0.05 | 0.428 | (0.95:1) | 56.4 | 28–30 | 20 | 3.0(a) | 54.9 | 3698 |
| F | 0.5 | 0.05 | 0.05 | 0.405 | (0.90:1) | 50.3 | 28 | 20 | 2.3(a) | 49.3 | 960 |
| G | 0.5 | 0.10 | 0.10 | 0.38 | (0.95:1) | 50.3 | 28 | 20 | 2.0(a) | 49.2 | 991 |

TABLE 10

Handsheet Evaluation of Reduced Epichlorohydrin Resins(a)

| | Dry Tensile (lbs/in) | | Wet Tensile (lbs/in) | |
|---|---|---|---|---|
| Designation | Uncured | Cured | Uncured | Cured |
| E | 17.3 | 17.2 | 3.96 | 4.08 |
| F | 16.1 | 17.2 | 3.92 | 4.13 |
| G | 16.8 | 17.4 | 3.95 | 3.98 |
| Kymene 557H | 14.7 | 16.3 | 3.24 | 3.61 |

(a)All corrected to 40 lb basis weight

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A water-soluble polyamidoamine resin having the structure:

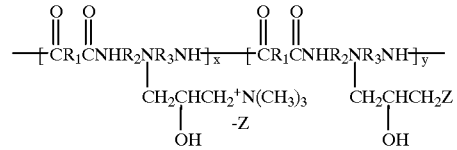

wherein $R_1$ is substituted or unsubstituted hydrocarbon substituent;

$R_2$ is substituted or unsubstituted hydrocarbon substituent;

$R_3$ is substituted or unsubstituted hydrocarbon substituent;

Z is halogen selected from the group consisting of F, Cl, Br and I, and combinations thereof;

x is from about 5 to about 45 mole %; and y is from about 55 to about 95 mole %.

2. The polyamidoamine resin of claim 1, wherein $R_1$ is alkylene of from 1–6 C atoms.

3. The polyamidoamine resin of claim 1, wherein $R_2$ is alkylene of from 2–4 C atoms.

4. The polyamidoamine resin of claim 1, wherein $R_3$ is alkylene of from 2–4 C atoms.

5. The polyamidoamine resin of claim 1, wherein x is from about 10 to about 30 mole %; and y is from about 70 to about 90 mole %.

6. The polyamidoamine resin of claim 1, wherein $R_1$ is alkylene of 1–6 C atoms;

$R_2$ is alkylene of 2–4 C atoms;

$R_3$ is alkylene of 2–4 C atoms;

Z is Cl;

x is from about 10 to about 30 mole %; and y is from about 70 to about 90 mole %.

7. A cellulosic product containing the resin of claim 6.

8. An aqueous solution comprising water and a polyamidoamine of claim 1, having a solids content of at least about 35%.

9. The solution of claim 8, having a solids content of at least about 50%.

10. The solution of claim 8, which also contains carboxymethyl cellulose.

11. A cellulosic product containing the resin of claim 1.

12. A method of preparing a water-soluble polyamidoamine resin, the method comprising:
reacting at least one polyamide having the structure

 (II)

wherein
- $R_1$ is substituted or unsubstituted hydrocarbon substituent;
- $R_2$ is substituted or unsubstituted hydrocarbon substituent;
- $R_3$ is substituted or unsubstituted hydrocarbon substituent;

with at least one ammonium halide compound and at least one epihalohydrin compound having the structures:

 (III)

and

 (IV)

wherein
Z is halogen selected from the group consisting of F, Cl, Br and I, and combinations thereof,
said reaction being carried out, when reactants II and III are reacted first, at a temperature between 45 and 80° C.; said reaction being carried out, when IV is added, at a temperature between 25–35° C.; the mole ratio of the compound of formula IV and the compound of formula II being about 1:1; the total molar ratio of compound III and IV being about stoichiometrically equal to the number of secondary amine in formula II.

13. A method of increasing the wet strength of a cellulosic product comprising cellulose fibers, comprising adding to one of the cellulose product or fibers a water-soluble polyamidoamine resin having the structure:

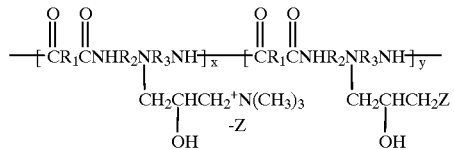

wherein
$R_1$ is substituted or unsubstituted hydrocarbon substituent;

$R_2$ is substituted or unsubstituted hydrocarbon substituent;

$R_3$ is substituted or unsubstituted hydrocarbon substituent;

Z is halogen selected from the group consisting of F, Cl, Br and I, and combinations thereof;

x is from about 5 to about 45 mole %; and y is from about 55 to about 95 mole %.

14. The method of claim 13, wherein $R_1$ is alkylene of from 1–6 C atoms.

15. The method of claim 14, wherein $R_2$ is alkylene of from 2–4 C atoms.

16. The method of claim 15, wherein $R_3$ is alkylene of from 2–4 C atoms.

17. A method of creping a cellulosic product comprising cellulose fibers, comprising adding to one of the cellulose product or fibers a water-soluble polyamidoamine resin having the structure:

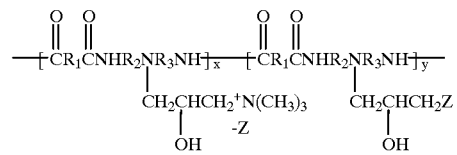

wherein $R_1$ is substituted or unsubstituted hydrocarbon substituent;

$R_2$ is substituted or unsubstituted hydrocarbon substituent;

$R_3$ is substituted or unsubstituted hydrocarbon substituent;

Z is halogen selected from F, Cl, Br and I;

x is from about 5 to about 45 mole %; and y is from about 55 to about 95 mole %.

18. The method of claim 17, wherein $R_1$ is alkylene of from 1–6 C atoms.

19. The method of claim 18, wherein $R_2$ is alkylene of from 2–4 C atoms.

20. The method of claim 19, wherein $R_3$ is alkylene of from 2–4 C atoms.

* * * * *